United States Patent
Han et al.

(10) Patent No.: US 12,087,980 B2
(45) Date of Patent: Sep. 10, 2024

(54) SYSTEM AND METHOD FOR CONTROLLING COLD START OF FUEL CELL

(71) Applicants: HYUNDAI MOTOR COMPANY, Seoul (KR); KIA CORPORATION, Seoul (KR)

(72) Inventors: Jae Ho Han, Suwon-si (KR); Dae Jong Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 232 days.

(21) Appl. No.: 17/459,769

(22) Filed: Aug. 27, 2021

(65) Prior Publication Data

US 2022/0190365 A1   Jun. 16, 2022

(30) Foreign Application Priority Data

Dec. 14, 2020   (KR) .......................... 10-2020-0174584

(51) Int. Cl.
*H01M 8/04302* (2016.01)
*H01M 8/04007* (2016.01)
(Continued)

(52) U.S. Cl.
CPC ... *H01M 8/04302* (2016.02); *H01M 8/04037* (2013.01); *H01M 8/04225* (2016.02);
(Continued)

(58) Field of Classification Search
CPC .......................... H01M 8/04223–04225; H01M 8/04246–04268; H01M 8/04298–04302; H01M 8/04604–04619
See application file for complete search history.

(56) References Cited

U.S. PATENT DOCUMENTS

2003/0162063 A1* 8/2003 Yoshizawa ............ H01M 8/241
429/413
2004/0175602 A1* 9/2004 Tahara .............. H01M 8/04529
429/432
(Continued)

FOREIGN PATENT DOCUMENTS

KR    20100051509 A  *  5/2010  ............ B60W 10/24
KR    101610392 B1     4/2016
WO    WO-2022038778 A1 * 2/2022  ............ H01M 10/44

OTHER PUBLICATIONS

Machine translation of Yoon, KR 2010-0051509. Originally published May 17, 2010. (Year: 2010).*

*Primary Examiner* — Jonathan Crepeau
*Assistant Examiner* — Jacob Buchanan
(74) *Attorney, Agent, or Firm* — MCDONNELL BOEHNEN HULBERT & BERGHOFF LLP

(57) ABSTRACT

Disclosed are a system and method for controlling a cold start of a fuel cell. The system includes a fuel cell configured to be supplied with fuel gas and oxidizing gas so as to generate electric power, a main bus terminal configured to electrically connect an output terminal of the fuel cell to a high-voltage battery, accessories, or a driving device so as to output the electric power generated by the fuel cell, a main relay provided at the main bus terminal between the output terminal of the fuel cell and the high-voltage battery, the accessories, or the driving device and configured to electrically connect or cut off the main bus terminal, a COD resistor connected to the main bus terminal at an output terminal side of the fuel cell with reference to the main relay, and a controller configured to supply the electric power generated by the fuel cell to the COD resistor in the state in which the main relay is cut off, and to control the COD resistor to consume the electric power generated by the fuel cell and supplied thereto.

15 Claims, 4 Drawing Sheets

(51) Int. Cl.
    *H01M 8/04223* (2016.01)
    *H01M 8/04225* (2016.01)
    *H01M 8/04537* (2016.01)
    *H01M 8/04701* (2016.01)
    *H01M 8/04858* (2016.01)

(52) U.S. Cl.
    CPC ... *H01M 8/04253* (2013.01); *H01M 8/04611* (2013.01); *H01M 8/04656* (2013.01); *H01M 8/04738* (2013.01); *H01M 8/0494* (2013.01); *H01M 2250/20* (2013.01)

(56) References Cited

U.S. PATENT DOCUMENTS

| | | | | |
|---|---|---|---|---|
| 2006/0280977 | A1* | 12/2006 | Sakajo | H01M 8/04723 429/432 |
| 2010/0028729 | A1* | 2/2010 | Billups | H01M 8/0494 429/432 |
| 2016/0351928 | A1* | 12/2016 | Hoshi | H01M 8/04582 |
| 2018/0323453 | A1* | 11/2018 | Arisetty | H01M 8/04992 |
| 2018/0342747 | A1* | 11/2018 | Kim | H01M 8/04917 |
| 2019/0165398 | A1* | 5/2019 | Park | H02J 7/34 |
| 2021/0376350 | A1* | 12/2021 | Ozeki | H01M 8/1004 |
| 2023/0253590 | A1* | 8/2023 | Ida | H01M 8/04604 429/9 |

* cited by examiner

SYSTEM AND METHOD FOR CONTROLLING COLD START OF FUEL CELL

CROSS REFERENCE TO RELATED APPLICATION

The present application claims priority to Korean Patent Application No. 10-2020-0174584 filed on Dec. 14, 2020, the entire contents of which is incorporated herein for all purposes by this reference.

BACKGROUND

1. Field

The present disclosure relates to technology for rapidly increasing the temperature of a fuel cell during a cold start of the fuel cell.

2. Description of the Prior Art

A fuel cell is a cell that directly converts chemical energy generated by oxidation of fuel into electrical energy, and is a kind of electric power generation device. Basically, a fuel cell is the same as a chemical cell in that the former uses oxidation and reduction reactions, but is different from a chemical cell in that, unlike the latter which performs a cell reaction inside a closed system, reactants are continuously supplied from the outside and a reaction product is continuously removed from the system. Recently, a fuel cell electric power generation system has been put into practical use, and since the reaction product of a fuel cell is pure water, research for using a fuel cell electric power generation system as an energy source for eco-friendly vehicles has been actively conducted.

The fuel cell system includes a fuel cell stack configured to generate electrical energy through a chemical reaction, an air supply device configured to supply air to an air electrode of the fuel cell stack, and a hydrogen supply device configured to supply hydrogen to a hydrogen electrode of the fuel cell stack. That is, air containing oxygen is supplied to the air electrode (cathode) of the fuel cell stack, and hydrogen is supplied to the hydrogen electrode (anode) of the fuel cell stack.

When a fuel cell is started in a cooled state, a cold-start strategy, in which self-heat generation of the fuel cell is induced and a load device is operated, is used. In general, load devices, which heat a fuel cell in a fuel cell vehicle, include accessories of a fuel cell vehicle, a high-voltage battery, and a resistor (cathode oxygen depletion (COD) resistor).

In particular, in cold-start control of a fuel cell, a main relay of a main bus terminal connecting the fuel cell to a high-voltage battery is connected, the high-voltage battery is charged while driving accessories including the air compressor, and electric power is consumed from the resistor at the same time.

Electric power is consumed by driving an air compressor during the cold-start control of a fuel cell. Problems such as deterioration of durability due to excess air being supercharged into the fuel cell stack, and excessive noise generation due to the driving of the air compressor can occur.

It should be understood that the foregoing description of the background art is provided merely for the purpose of promoting the understanding of the background of the present disclosure and should not to be accepted as acknowledging that the background art is known to those skilled in the art.

SUMMARY

The present disclosure provides a cold-start control technology for preventing air supercharge while securing the maximum load for warming a fuel cell during the cold-start control of the fuel cell.

A system for controlling a cold start of a fuel cell according to the present disclosure in order to achieve an objective described above includes: a fuel cell configured to be supplied with fuel gas and oxidizing gas so as to generate electric power, a main bus terminal configured to electrically connect an output terminal of the fuel cell to a high-voltage battery, accessories, or a driving device so as to output the electric power generated by the fuel cell, a main relay provided at the main bus terminal between the output terminal of the fuel cell and the high-voltage battery, the accessories, or the driving device and configured to electrically connect or cut off the main bus terminal, a COD resistor connected to the main bus terminal at an output terminal side of the fuel cell with reference to the main relay, and a controller configured to supply the electric power generated by the fuel cell to the COD resistor in the state in which the main relay is cut off, and to control the COD resistor to consume the electric power generated by the fuel cell and supplied thereto.

The COD resistor may be configured to be capable of actively controlling power consumption through switching control, and the controller may be configured to control the COD resistor such that an output voltage of the fuel cell is maintained below a preset voltage.

The controller may be configured to supply electric power to the accessories or the driving device by discharging the high-voltage battery.

The system may further include a monitor unit configured to monitor an amount of charge or outputable electric power of the high-voltage battery. The controller may be configured to perform control operations such that the main relay is connected when the amount of charge of the high-voltage battery monitored by the monitor unit is equal to or smaller than a preset amount of charge or the outputable electric power is equal to or smaller than a preset electric power.

The controller may be configured to perform control operations such that, when an output voltage of the fuel cell is equal to or greater than a preset voltage, the main relay is connected so that the electric power generated by the fuel cell is supplied to the high-voltage battery, the accessories, or the driving device.

The controller may be configured to perform control operations such that the main relay is connected when the electric power generated by the fuel cell is equal to or greater than a maximum power consumption of the COD resistor.

The controller may be configured to perform control operations such that, when a time consumed for supplying the electric power generated by the fuel cell to the COD resistor in the state in which the main relay is cut off is equal to or longer than a preset time, the main relay is connected based on a sum of a calorific value of the fuel cell and a calorific value of the COD resistor.

The system may further include a determination unit configured to determine a cold-start condition based on a temperature of the coolant circulated so as to cool the fuel cell or a temperature of air supplied to or discharged from the fuel cell. The controller may be configured to supply the electric power generated by the fuel cell to the COD resistor in a state in which the main relay is cut off when the determination unit determines that the cold-start condition is satisfied.

The controller may be configured to supply the electric power generated by the fuel cell to the COD resistor as well as to the high-voltage battery, the accessories, or the driving device while performing control such that the main relay is connected when the determination unit determines that the cold-start condition is satisfied and when the temperature of the coolant or the air is equal to or higher than a preset temperature.

A method of controlling a cold start of a fuel cell according to the present disclosure for achieving the objective described above may include: a step supplying electric power generated by a fuel cell in a state in which a main relay of a main bus terminal, which electrically connects an output terminal of the fuel cell to a high-voltage battery, accessories, or a driving device, is cut off, and a step of controlling the COD resistor to consume the electric power generated by the fuel cell.

The COD resistor may be configured to be capable of actively controlling power consumption through switching control, and in the step of controlling the COD resistor, the COD resistor may be controlled such that an output voltage of the fuel cell is maintained below a preset voltage.

The method may further include, after the step of supplying the electric power to the COD resistor, a step of discharging the high-voltage battery so as to supply electric power to the accessories or the driving device.

The method may further include: a step of monitoring an amount of charge or outputable electric power of the high-voltage battery before the supplying of the electric power to the accessories or the driving device; and a step of performing control such that the main relay is connected when the monitored amount of charge of the high-voltage battery is equal to or less than a preset amount of charge or when the outputable electric power is equal to or less than a preset electric power.

The method may further include, after the step of controlling the COD resistor, a step of supplying the electric power generated by the fuel cell to the high-voltage battery, the accessories, or the driving device by performing control such that the main relay is connected when the output voltage of the fuel cell is equal to or greater than the preset voltage.

The method may further include, after the step of controlling the COD resistor, a step of performing control such that the main relay is connected when the sum of the electric power generated by the fuel cell is equal to or greater than the maximum power consumption of the COD resistor or when the sum of the calorific value of the fuel cell and the calorific value of the COD resistor is maximized.

The method may further include, before the step of supplying the electric power to the COD resistor, a step of determining a cold-start condition based on a temperature of coolant circulated to cool the fuel cell or a temperature of air supplied to or discharged from the fuel cell. In the step of supplying the electric power to the COD resistor, when it is determined that the cold-start condition is satisfied, the electric power generated by the fuel cell may be supplied to the COD resistor in the state in which the main relay is cut off.

The method may further include after the step of determining the cold-start condition, a step of supplying the electric power generated by the fuel cell to the COD resistor as well as to the high-voltage battery, the accessories, or the driving device in a state of performing control such that the main relay is connected when it is determined that the cold-start condition is satisfied and when the temperature of the coolant or the temperature of the air is equal to or higher than the preset temperature.

With a system and method for controlling a cold start of a fuel cell according to the present disclosure, it is possible to quickly increase the calorific amount of a fuel cell during a cold start.

In addition, it is possible to solve the problems of reduction in durability and generation of noise due to air supercharging of an air compressor.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
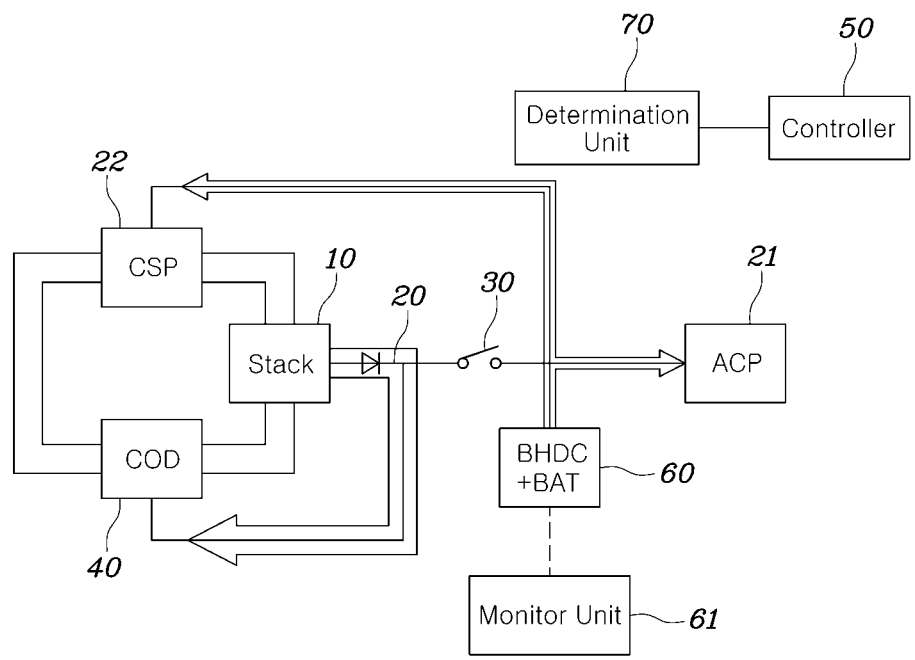
FIG. 1 is a block diagram illustrating an initial state of a cold start performed by a system for controlling the cold start of a fuel cell according to an embodiment of the present disclosure.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e. "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary embodiments of the present disclosure will be described in detail with reference to the accompanying drawings. The same or like reference signs presented in the drawings designate the same or like elements.

FIG. 1 is a block diagram illustrating an initial state of the cold start performed by a system for controlling the cold start of a fuel cell 10 according to an embodiment of the present disclosure.

Referring to FIG. 1, a system for controlling a cold start of a fuel cell 10 according to an embodiment of the present disclosure includes: a fuel cell 10 configured to be supplied with each of fuel gas and oxidizing gas so as to generate electric power, a main bus terminal 20 configured to electrically connect the output terminal of the fuel cell 10 to a high-voltage battery 60, accessories 21 and 22, or a driving device (not illustrated) so as to output the electric power generated by the fuel cell 10; a main relay 30 provided at the main bus terminal 20 between the output terminal of the fuel cell 10 and the high-voltage battery 60, the accessories 21 and 22, or the driving device (not illustrated) and configured to electrically connect or cut off the main bus terminal 20, a COD resistor 40 connected to the main bus terminal 20 at the output terminal side of the fuel cell 10 with reference to the main relay 30, and a controller 50 configured to supply the electric power generated by the fuel cell 10 to the COD resistor 40 in the state of cutting off the main relay 30 and to control the COD resistor 40 to consume the electric power generated by the fuel cell 10 and supplied thereto.

The controller 50 according to an exemplary embodiment of the present disclosure may be implemented using a nonvolatile memory (not illustrated) configured to store an algorithm, which is configured to control operations of various components of a vehicle or data related to a software command for reproducing the algorithm, and a processor (not illustrated) configured to perform operations described below using the data stored in the corresponding memory. Here, the memory and the processor may be implemented as separate chips. Alternatively, the memory and processor may be implemented as a single chip integrated with each other. The processor may take a form of one or more processors.

The fuel cell 10 generates electric power by receiving fuel gas at the anode side and oxidizing gas at the cathode side. The fuel cell 10 may be a fuel cell stack including a plurality of stacked cells. In an embodiment, the fuel gas is hydrogen, the oxidizing gas is oxygen, and the fuel cell 10 may be supplied with air containing oxygen.

The main bus terminal 20 may be electrically connected to the output terminal of the fuel cell 10 so as to transmit electric power generated by the fuel cell 10. In particular, as will be described later, the main bus terminal 20 may be connected to the high-voltage battery 60, the accessories 21 and 22, or the driving device (not illustrated) so as to transmit electric power generated by the fuel cell 10.

The high-voltage battery 60 may be charged with the electric power generated by the fuel cell 10, and on the contrary, the high-voltage battery 60 may supply electric power to the accessories 21 and 22 or the driving device (not illustrated) connected to the main bus terminal 20 while being discharged. In particular, the high-voltage battery 60 is connected to the main bus terminal 20 via a bidirectional high-voltage DC/DC converter (BHDC), and may be charged or discharged by voltage control of the bidirectional converter.

The main bus terminal 20 is provided with the main relay 30 so as to electrically connect or cut off the output terminal of the fuel cell 10 to or from the high-voltage battery 60, the accessories 21 and 22, and the driving device (not illustrated). When the main bus terminal 20 is connected, the generated electric power of the fuel cell 10 may be transmitted to the high-voltage battery 60, the accessories 21 and 22, or the driving device (not illustrated), and when the main bus terminal 20 is cut off, the generated electric power of the fuel cell 10 may not be transmitted to the high-voltage battery 60, the accessories 21 and 22, or the driving device (not illustrated).

The COD resistor 40 may be connected to the main bus terminal 20 at the output terminal side of the fuel cell 10 with reference to the main relay 30. That is, even in the state in which the main relay 30 is cut off, the COD resistor 40 may be connected to the output terminal of the fuel cell 10 via the main bus terminal 20.

A COD resistor 40 in the related art is merely a resistor connected to opposite ends, but the COD resistor 40 according to an embodiment of the present disclosure may be a device capable of output control. That is, the COD resistor 40 may be a device capable of controlling power consumption while including a resistor that generates heat while consuming electric power received from the output terminal of the fuel cell 10.

The controller 50 may supply electric power generated by the fuel cell 10 to the COD resistor 40 via the main bus terminal 20 in the state in which the main relay 30 is cut off. In addition, the controller 50 may control the COD resistor 40 to consume electric power supplied from the fuel cell 10.

In an embodiment, the controller 50 may perform control operations such that the main relay 30 is cut off during a cold-start control, but in general, the main relay 30 may be in the state of being cut off during the start of the fuel cell 10.

In the state in which the main relay 30 is connected, the output voltage of the fuel cell 10 should be maintained at a level equal to or higher than the minimum voltage for driving the accessories 21 and 22 or the driving device (not illustrated) to be described later. However, in the state in which the main relay 30 is cut off, since the fuel cell 10 generates electric power at low efficiency at a voltage lower than the minimum voltage for driving the accessories 21 and 22 or the driving device (not illustrated), the fuel cell 10 is capable of increasing its own calorific value.

Accordingly, according to the cold-start control of the present disclosure, the calorific value of the fuel cell 10 itself is increased by controlling the power consumption of the COD resistor 40 in the state in which the main relay 30 is cut off.

More specifically, the COD resistor 40 is capable of actively controlling power consumption through switching control, and the controller 50 may control the COD resistor 40 such that the output voltage of the fuel cell 10 is maintained below a preset voltage.

In an embodiment, the controller 50 may control the COD resistor 40 such that the voltage at the output terminal of the fuel cell 10 is maintained at a low-voltage state (e.g., 150 V) that is lower than a preset voltage.

In an embodiment, the COD resistor 40 may include an isolated gate bipolar transistor (IGBT), and power consumption may be controlled by a switching control. In an embodiment, the COD resistor 40 may vary in power consumption in the range of 10 kW to 30 kW under the control of the controller 50.

In this way, by applying a COD heater capable of active output control, the output of the COD heater can be varied based on the output voltage of the fuel cell 10 and the electric power consumed by the COD heater during a cold start, thereby maximizing warming load.

In other words, through the output-variable control of the COD heater capable of active output control, it is possible to secure sufficient warming load even if air supercharging is not performed unlike the cold-start strategy in which it is necessary to supercharge air using the current consumed by the air compressor 21 as warming load during a cold start in the prior art.

The controller 50 may supply electric power to the accessories 21 and 22 or the driving device (not illustrated) by discharging the high-voltage battery 60.

The controller 50 may supply electric power to the accessories 21 and 22 or the driving device (not illustrated) via the main bus terminal 20 by discharging the high-voltage battery 60 in the state in which the main relay 30 is cut off, and at the same time, the controller 50 may supply the electric power generated by the fuel cell 10 to the COD resistor 40 via the main bus terminal 20.

In an embodiment, the accessories 21 and 22 (BOP) may include an air compressors 21 (ACP) configured to supply air to the fuel cell 10, a cooling pump 22 (CSP) configured to circulate the coolant that cools the fuel cell 10, and the like.

The controller may drive the accessories 21 and 22 or the driving device (not illustrated) using the electric power charged in the high-voltage battery 60 while performing control such that the high-voltage battery 60 is discharged before connecting the main relay 30. Thereafter, in the state in which the main relay 30 is connected, the controller may drive the accessories 21 and 22 or the driving device (not illustrated) using the electric power generated by the fuel cell 10.

Figure 2:
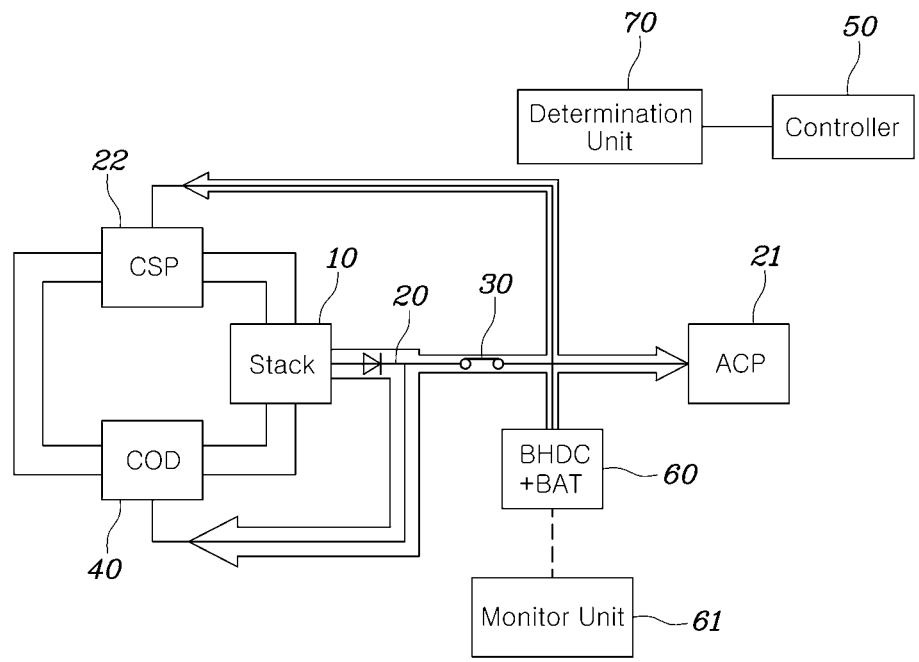
FIG. 2 is a block diagram illustrating a terminal state of a cold start performed by the system for controlling the cold start of a fuel cell according to an embodiment of the present disclosure.

FIG. 2 is a block diagram illustrating a terminal state of the cold start of the fuel cell 10 performed by the system for controlling the cold start of a fuel cell 10 according to an embodiment of the present disclosure.

Further referring to FIG. 2, the system may further include a monitor unit 61 configured to monitor the amount of charge or the outputable electric power of the high-voltage battery 60. The controller 50 may perform control operations such that the main relay 30 is connected when the amount of charge of the high-voltage battery monitored by the monitor unit 61 is equal to or smaller than the preset amount of charge or the outputable electric power is equal to or smaller than the preset electric power.

In an embodiment, the monitor unit 61 may be a battery management system (BMS) configured to monitor the amount of charge (state of charge (SOC)) of the high-voltage battery 60 in real time, or to monitor the outputable electric power of the high-voltage battery 60 depending on the amount of charge of the high-voltage battery 60, the state of the bidirectional converter, or the like in real time.

When the amount of charge of the high-voltage battery 60 monitored by the monitor unit 61 is equal to or smaller than the preset amount of charge or the outputable electric power is equal to or smaller than the present electric power, the controller 50 may perform control operations such that the main relay 30 is connected.

Here, the preset amount of charge or the preset electric power may be preset based on the electric power required by the accessories 21 and 22 or the driving device (not illustrated).

In the state in which it is difficult to supply the required electric power of the accessories 21 and 22 or the driving device (not illustrated) based on the amount of charge or the outputable electric power of the high-voltage battery 60, the controller 50 may perform control operations such that the main relay 30 is connected, whereby the electric power generated by the fuel cell 10 can be supplied to the accessories 21 and 22 or the driving device (not illustrated) or the high-voltage battery 60 can be charged.

In another embodiment, the controller 50 may perform control operations such that, when the output voltage of the fuel cell 10 is equal to or greater than the preset voltage, the main relay 30 is connected so that the electric power generated by the fuel cell 10 can be supplied to the high-voltage battery 60, the accessories 21 and 22, or the driving device (not illustrated).

That is, in the initial state of the cold start of the fuel cell 10, the controller 50 may control the electric power generation of the fuel cell 10 in the state in which the main relay 30 is cut off, and in the terminal state of the cold start of the fuel cell 10 performed by the system for controlling the cold start, the controller 50 may perform control operations such that the main relay 30 is connected.

In an embodiment, when the output voltage of the fuel cell 10 rises to be equal to or higher than the preset voltage, the controller 50 may perform control operations such that the main relay 30 is connected.

The controller 50 may perform control operations such that a low-efficiency operation is performed to maintain the output terminal voltage of the fuel cell 10 at a voltage lower than the preset voltage in the state in which the main relay 30 is cut off, and when the output current of the fuel cell 10 is not exhausted by the COD resistor 40, the output voltage of the fuel cell 10 may increase.

Here, the preset voltage may be preset as a minimum voltage for driving the accessories 21 and 22 or the driving device (not illustrated).

In another embodiment, the controller 50 may perform control operations such that the main relay is connected when the electric power generated by the fuel cell 10 is equal to or greater than the maximum power consumption of the COD resistor 40.

When the electric power generated by the fuel cell 10 increases to be equal to or greater than the maximum power consumption of the COD resistor 40, the controller 50 may control such that the main relay 30 is connected.

Specifically, the controller 50 may cause the electric power generated by the fuel cell 10 to be consumed while increasing the power consumption of the COD resistor 40, and in the state in which the power consumption of the COD resistor 40 reaches the maximum power consumption and thus the electric power generated by the fuel cell 10 is not consumable any more, the controller 50 may perform control operations such that the main relay 30 is connected.

In another embodiment, even if the power consumption of the COD resistor 40 is not the maximum power consumption, when the sum of the power consumption of the accessories 21 and 22 or the driving device (not illustrated), the charging electric power of the high-voltage electric power battery 60, and the power consumption of the COD resistor 40 is maximum, the controller 50 may perform control operations such that the main relay 30 is connected. This is because, in the state in which the main relay 30 is connected, the warming load for a cold start corresponds to the sum of the power consumption or charging electric power of the COD resistor 40, the accessories 21 and 22, the driving device (not illustrated), and the high-voltage battery 60.

In another embodiment, the controller 50 may perform control operations such that, when the time consumed for supplying electric power generated by the fuel cell 10 to the COD resistor 40 in the state in which the main relay 30 is cut off is equal to or longer than a preset time, the main relay is connected based on the sum of the calorific value of the fuel cell 10 and the calorific value of the COD resistor 40.

Here, the preset time may be preset by experimentally measuring a time required for the power consumption of the COD resistor 40 to be maximized or for the voltage at the output terminal of the fuel cell 10 to rise to the preset voltage.

In particular, the controller 50 may perform control operations such that the main relay 30 is connected when the sum of the calorific value of the fuel cell 10 and the calorific value of the COD resistor 40 is maximized.

The COD resistor 40 may be included inside a cooling line for cooling the fuel cell 10 so as to heat coolant. Since the purpose of controlling the cold start of the fuel cell 10 is to warm the entire fuel cell system, the total calorific value may be the sum of the calorific value of the fuel cell 10, which is the calorific value generated by the fuel cell 10 itself, and a COD calorific value generated by the COD resistor 40.

During the cold-start control of the fuel cell 10, the controller 50 may perform control operations such that the total calorific value, which is the sum of the calorific value of the fuel cell 10 and the calorific value of the COD resistor 40, increases. In particular, the controller 50 may perform control operations such that the calorific value of the fuel cell 10 and the calorific value of the COD resistor 40 increases in the state in which the main relay 30 is cut off at the initial stage of the cold-start control.

The controller 50 may perform control operations such that, when the total calorific value, which is the sum of the calorific value of the fuel cell 10 and the calorific value of the COD resistor 40, is maximized and does not increase any more, the main relay 30 is connected.

In addition, the system may further include a determination unit 70 configured to determine a cold-start condition based on the temperature of the coolant circulated so as to cool the fuel cell 10 or the temperature of air supplied to or discharged from the fuel cell 10. When the determination unit 70 determines that the cold-start condition is satisfied, the controller 50 may supply the electric power generated by the fuel cell 10 to the COD resistor 40 in the state in which the main relay 30 is cut off.

The determination unit 70 may determine whether the cold-start condition of the fuel cell 10 is satisfied. Specifically, the determination unit 70 may determine the cold-start condition based on the temperature of the coolant passing through the fuel cell 10 or the temperature of air discharged from the fuel cell 10.

That is, since it is difficult to directly measure the temperature inside the fuel cell 10, the determination unit 70 may estimate the temperature inside the fuel cell 10 based on the temperature of the coolant or air passing through the fuel cell 10 so as to determine the cold-start condition.

In an embodiment, the determination unit 70 may determine whether or not the temperature of the coolant discharged through the fuel cell 10 or the temperature of the air supplied to the fuel cell 10 and then discharged from the fuel cell 10 is equal to or lower than a preset cold start temperature.

When the determination unit 70 determines that the cold-start condition is satisfied, the controller 50 may control the fuel cell 10 is warmed while supplying the electric power generated by the fuel cell 10 to the COD resistor 40 in the state in which the main relay 30 is cut off.

More specifically, the controller 50 may supply the electric power generated by the fuel cell 10 to the COD resistor 40 as well as to the high-voltage battery 60, the accessories 21 and 22, or the driving device (not illustrated) while performing control such that the main relay 30 is connected when the determination unit 70 determines that the cold-start condition is satisfied and when the temperature of the coolant or the air is equal to or higher than a preset temperature.

Here, the preset temperature may be preset to be lower than the cold start temperature preset so as to determine the cold-start condition. When the temperature of the coolant or the temperature of the air is lower than the preset temperature, the determination unit 70 may determine that it is a cryogenic state.

In contrast, when the it is determined that the cold-start condition is satisfied based on the temperature of the coolant or the temperature of the air and when the temperature of the coolant or the temperature of the air is equal to or higher than the preset temperature, the determination may determine that it is a normal cold-start condition rather than a cryogenic state.

When the determination unit 70 determines that it is a normal cold-start condition rather than a cryogenic state, the controller 50 may perform control operations such that the main relay 30 is connected. Accordingly, the electric power generated by the fuel cell 10 may be supplied to the COD resistor 40 as well as to the high-voltage battery 60, the accessories 21 and 22, or the driving device (not illustrated). Accordingly, when it is not a cryogenic state, the time required for performing the cold-start control can be reduced.

Figure 3:
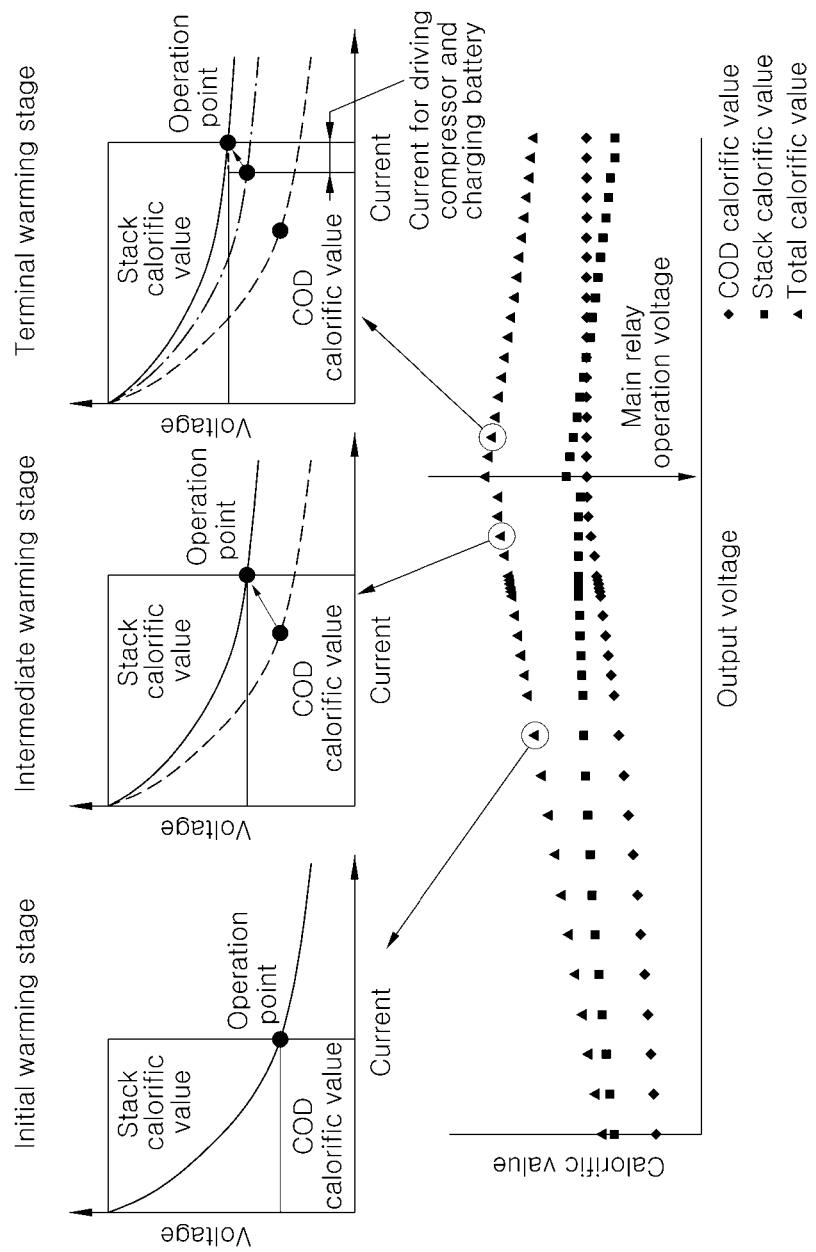
FIG. 3 illustrates graphs showing calorific values of a fuel cell in the system for controlling the cold start of a fuel cell according to an embodiment of the present disclosure.

FIG. 3 illustrates graphs showing the calorific values generated by the fuel cell 10 in the system for controlling the cold start of a fuel cell 10 according to an embodiment of the present disclosure.

Further referring to FIG. 3, the system for controlling the cold start of a fuel cell 10 according to an embodiment of the present disclosure may operate the fuel cell 10 at an operating point for increasing the calorific value (stack calorific value) of the fuel cell 10 at the initial warming stage.

In particular, the controller 50 may control the COD resistor 40 to consume the electric power generated by the fuel cell 10 through heat generation (COD calorific value) while increasing the calorific value (stack calorific value) of the fuel cell 10 by maintaining a low voltage at the output terminal of the fuel cell 10 at the initial warming stage.

When the cold-start control of the fuel cell 10 continues, at the intermediate warming stage, the operating point of the fuel cell 10 may be moved in the direction in which the output current of the fuel cell 10 increases and the output voltage of the fuel cell 10 also increases. Accordingly, the calorific value (COD calorific value) of the COD resistor 40, which consumes the electric power generated by the fuel cell 10, may gradually increase.

When the voltage at the output terminal of the fuel cell 10 continuously increases, and when the voltage at the output terminal of the fuel cell 10 rises to be equal to or higher than the preset voltage of the main relay 30 at the terminal warming stage, the controller 50 may perform control operations such that the main relay 30 is connected.

In addition, when the power consumption of the COD resistor 40 is maximized and is not able to increase any more, the controller 50 may maintain the maximum COD calorific value and may cause the main relay 30 to be connected, thereby supplying the electric power generated by the fuel cell 10 to the high-voltage battery 60, the accessories 21 and 22, or the driving device (not illustrated), in addition to supplying the power consumption of the COD resistor 40.

At a preset voltage at which the main relay 30 is connected, the total calorific value, which is the sum of the COD calorific value and the stack calorific value may be maximized.

In addition, at the terminal warming stage after the main relay 30 is connected, the operating point of the fuel cell 10 is moved in the direction in which the voltage and the current at the output terminal further increases. Accordingly, the electric power generated by the fuel cell 10 may exceed the power consumption of the COD resistor 40. The generated electric power of the fuel cell 10 that exceeds the power consumption of the COD resistor 40 may charge the high-voltage battery 60, or may be consumed by the accessories 21 and 22 or the driving device (not illustrated).

Figure 4:
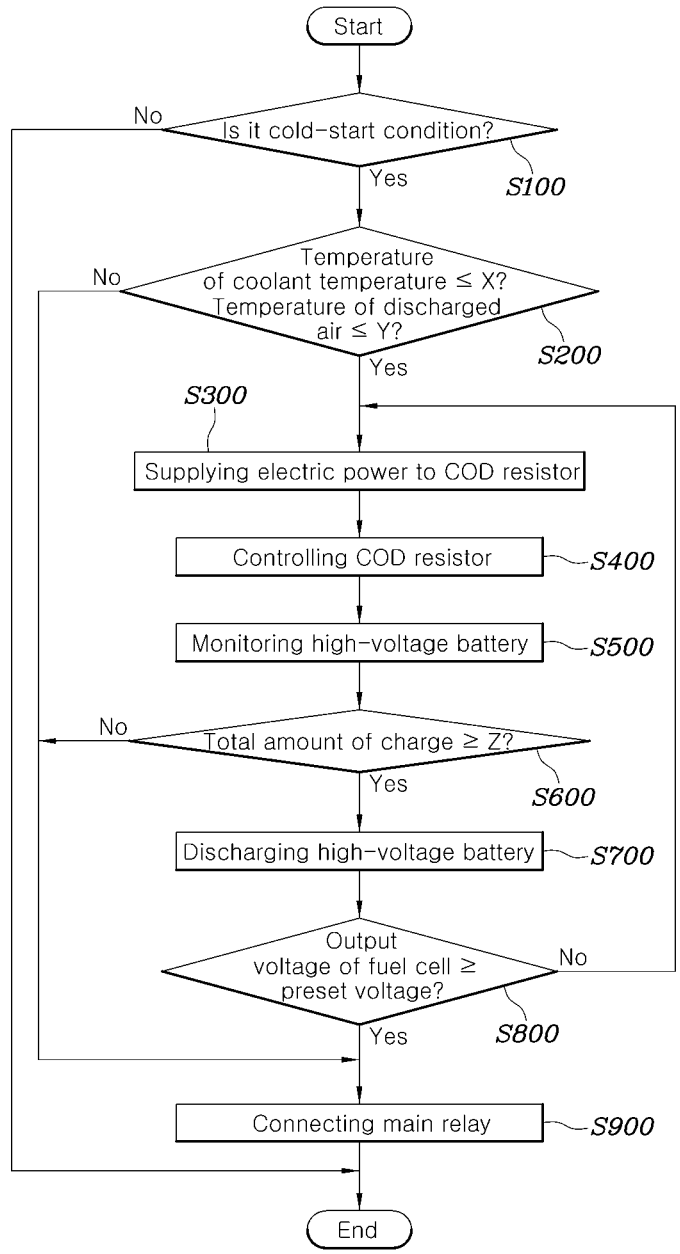
FIG. 4 is a flowchart of a method for controlling the cold start of a fuel cell according to an embodiment of the present disclosure.

FIG. 4 is a flowchart of a cold start of a method for controlling the cold start of the fuel cell 10 according to an embodiment of the present disclosure.

Further referring to FIG. 4, a method for controlling the cold start of the fuel cell 10 according to an embodiment of the present disclosure includes: a step of supplying the electric power generated by the fuel cell 10 in the state in which the main relay 30 of the main bus terminal 20, which electrically connects the output terminal of the fuel cell 10 to the high-voltage battery 60, the accessories 21 and 22, or the driving device (not illustrated), is cut off (S300); and a step of controlling the COD resistor 40 to consume the electric power generated by the fuel cell 10 (S400).

The COD resistor 40 is capable of active control of the power consumption through the switching control, and in the step of controlling the COD resistor 40 (S400), the COD resistor 40 may be controlled such that the output voltage of the fuel cell 10 is maintained below a preset voltage.

After the step of supplying the electric power to the COD resistor 40 (S300), the method may further include a step of discharging the high-voltage battery 60 so as to supply electric power to the accessories 21 and 22 or the driving device (not illustrated) (S700).

The method may further include: a step of monitoring the amount of charge or outputable electric power of the high-voltage battery 60 (S500,S600) before the supplying of the electric power to the accessories 21 and 22 or the driving device (not illustrated) (S700); and a step of performing control such that the main relay 30 is connected when the monitored amount of charge of the high-voltage battery 60 is equal to or less than a preset amount of charge or when the outputable electric power is equal to or less than a preset electric power (S900).

After the step of controlling the COD resistor 40 (S400), the method may further include a step of supplying the electric power generated by the fuel cell 10 to the high-voltage battery 60, the accessories 21 and 22, or the driving device (not illustrated) by performing control such that the main relay 30 is connected (S900) when the output voltage of the fuel cell 10 is equal to or greater than the preset voltage (S800).

After the step of controlling the COD resistor 40 (S400), the method may further include a step of performing control such that the main relay 30 is connected when the sum of the electric power generated by the fuel cell 10 is equal to or greater than the maximum power consumption of the COD resistor 40 or when the sum of the calorific value of the fuel cell 10 and the calorific value of the COD resistor 40 is maximized (S900).

Before the step of supplying electric power to the COD resistor 40 (S300), the method may further include a step of determining a cold-start condition based on the temperature of the coolant circulated to cool the fuel cell 10 or the temperature of air supplied to or discharged from the fuel cell 10 (S100). In the step of supplying electric power to the COD resistor 40 (S300), when it is determined that the cold-start condition is satisfied, the electric power generated by the fuel cell 10 may be supplied to the COD resistor 40 in the state in which the main relay 30 is cut off.

After the step of determining the cold-start condition (S100), the method may further include a step of supplying the electric power generated by the fuel cell 10 to the COD resistor 40 as well as to the high-voltage battery 60, the accessories 21 and 22, or the driving device (not illustrated) in the state of performing control such that the main relay 30 is connected (S900) when the determination unit 70 determines that the cold-start condition is satisfied and when the temperature of the coolant or the temperature of the air is equal to or higher than the preset temperature (S200).

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A system of controlling a cold start of a fuel cell, the system comprising:
   a fuel cell configured to be supplied with fuel gas and oxidizing gas so as to generate electric power;
   a main bus terminal configured to electrically connect an output terminal of the fuel cell to a high-voltage battery, accessories, or a driving device so as to output the electric power generated by the fuel cell;
   a main relay provided at the main bus terminal between the output terminal of the fuel cell and the high-voltage battery, the accessories, or the driving device and configured to electrically connect to or cut off the main bus terminal;

a COD resistor connected to the main bus terminal at an output terminal side of the fuel cell with reference to the main relay; and
a controller configured to supply the electric power generated by the fuel cell to the COD resistor in a state in which the main relay is cut off, and to control the COD resistor to consume the electric power generated by the fuel cell and supplied thereto,
wherein the controller is configured to perform control operations such that, when a time consumed for supplying the electric power generated by the fuel cell to the COD resistor in a state in which the main relay is cut off is equal to or longer than a preset time, the main relay is connected based on a sum of a calorific value of the fuel cell and a calorific value of the COD resistor,
wherein the controller is configured to perform control operations such that the main relay is connected when the sum of the calorific value of the fuel cell and the calorific value of the COD resistor is maximized.

2. The system of claim 1, wherein the controller is configured to supply electric power to the accessories or the driving device by discharging the high-voltage battery.

3. The system of claim 2, further comprising:
a monitor unit configured to monitor an amount of charge or outputable electric power of the high-voltage battery,
wherein the controller is configured to perform control such that the main relay is connected when the amount of charge of the high-voltage battery monitored by the monitor unit is equal to or smaller than a preset amount of charge or the outputable electric power is equal to or smaller than a preset electric power.

4. The system of claim 1, wherein the controller is configured to perform control such that, when an output voltage of the fuel cell is equal to or greater than a preset voltage, the main relay is connected so that the electric power generated by the fuel cell is supplied to the high-voltage battery, the accessories, or the driving device.

5. The system of claim 1, wherein the controller is configured to perform control such that the main relay is connected when the electric power generated by the fuel cell is equal to or greater than a maximum power consumption of the COD resistor.

6. The system of claim 1, wherein the COD resistor is configured to be capable of actively controlling power consumption through a switching control, and the controller is configured to control the COD resistor such that an output voltage of the fuel cell is maintained below a preset voltage, and
wherein the preset voltage is a voltage lower than a minimum voltage for driving the accessories and or the driving device.

7. The system of claim 1, further comprising:
a determination unit configured to determine a cold-start condition based on a temperature of the coolant circulated so as to cool the fuel cell or a temperature of air supplied to or discharged from the fuel cell,
wherein the controller is configured to supply the electric power generated by the fuel cell to the COD resistor in a state in which the main relay is cut off when the determination unit determines that the cold-start condition is satisfied.

8. The system of claim 7, wherein the controller is configured to supply the electric power generated by the fuel cell to the COD resistor as well as to the high-voltage battery, the accessories, or the driving device while performing control such that the main relay is connected when the determination unit determines that the cold-start condition is satisfied and when the temperature of the coolant or the air is equal to or higher than a preset temperature.

9. A method of controlling a cold start of a fuel cell, the method comprising:
supplying electric power generated by a fuel cell in a state in which a main relay of a main bus terminal, which electrically connects an output terminal of the fuel cell to a high-voltage battery, accessories, or a driving device, is cut off; and
controlling a COD resistor to consume the electric power generated by the fuel cell,
after the controlling of the COD resistor, performing control such that the main relay is connected when a sum of the electric power generated by the fuel cell is equal to or greater than a maximum power consumption of the COD resistor or when a sum of the calorific value of the fuel cell and a calorific value of the COD resistor is maximized.

10. The method of claim 9, further comprising:
after the supplying of the electric power to the COD resistor, discharging the high-voltage battery so as to supply electric power to the accessories or the driving device.

11. The method of claim 10, further comprising:
monitoring an amount of charge or outputable electric power of the high-voltage battery before the supplying of the electric power to the accessories or the driving device; and
performing control such that the main relay is connected when the monitored amount of charge of the high-voltage battery is equal to or less than a preset amount of charge or when the outputable electric power is equal to or less than a preset electric power.

12. The method of claim 9, further comprising:
after the controlling of the COD resistor, supplying the electric power generated by the fuel cell to the high-voltage battery, the accessories, or the driving device by performing control such that the main relay is connected when the output voltage of the fuel cell is equal to or greater than the preset voltage.

13. The method of claim 9,
wherein the COD resistor is configured to be capable of actively controlling power consumption through switching control, and the controlling is configured to control the COD resistor such that an output voltage of the fuel cell is maintained below a preset voltage, and
wherein the preset voltage is a voltage lower than a minimum voltage for driving the accessories and or the driving device.

14. The method of claim 9, further comprising:
before the supplying of the electric power to the COD resistor, determining a cold-start condition based on a temperature of coolant circulated to cool the fuel cell or a temperature of air supplied to or discharged from the fuel cell,
wherein, in the supplying of the electric power to the COD resistor, when it is determined that the cold-start condition is satisfied, the electric power generated by the fuel cell is supplied to the COD resistor in a state in which the main relay is cut off.

15. The method of claim 14, further comprising:
after the determining of the cold-start condition, supplying the electric power generated by the fuel cell to the COD resistor as well as to the high-voltage battery, the accessories, or the driving device in a state of performing control such that the main relay is connected when the it is determined that the cold-start condition is satisfied and when the temperature of the coolant or the temperature of the air is equal to or higher than the preset temperature.

* * * * *